June 25, 1935.  T. S. BARBER  2,006,125
HEADLIGHT
Filed April 12, 1934   2 Sheets-Sheet 1

Inventor
THEODORE S. BARBER

Attorneys

June 25, 1935.  T. S. BARBER  2,006,125
HEADLIGHT
Filed April 12, 1934   2 Sheets-Sheet 2
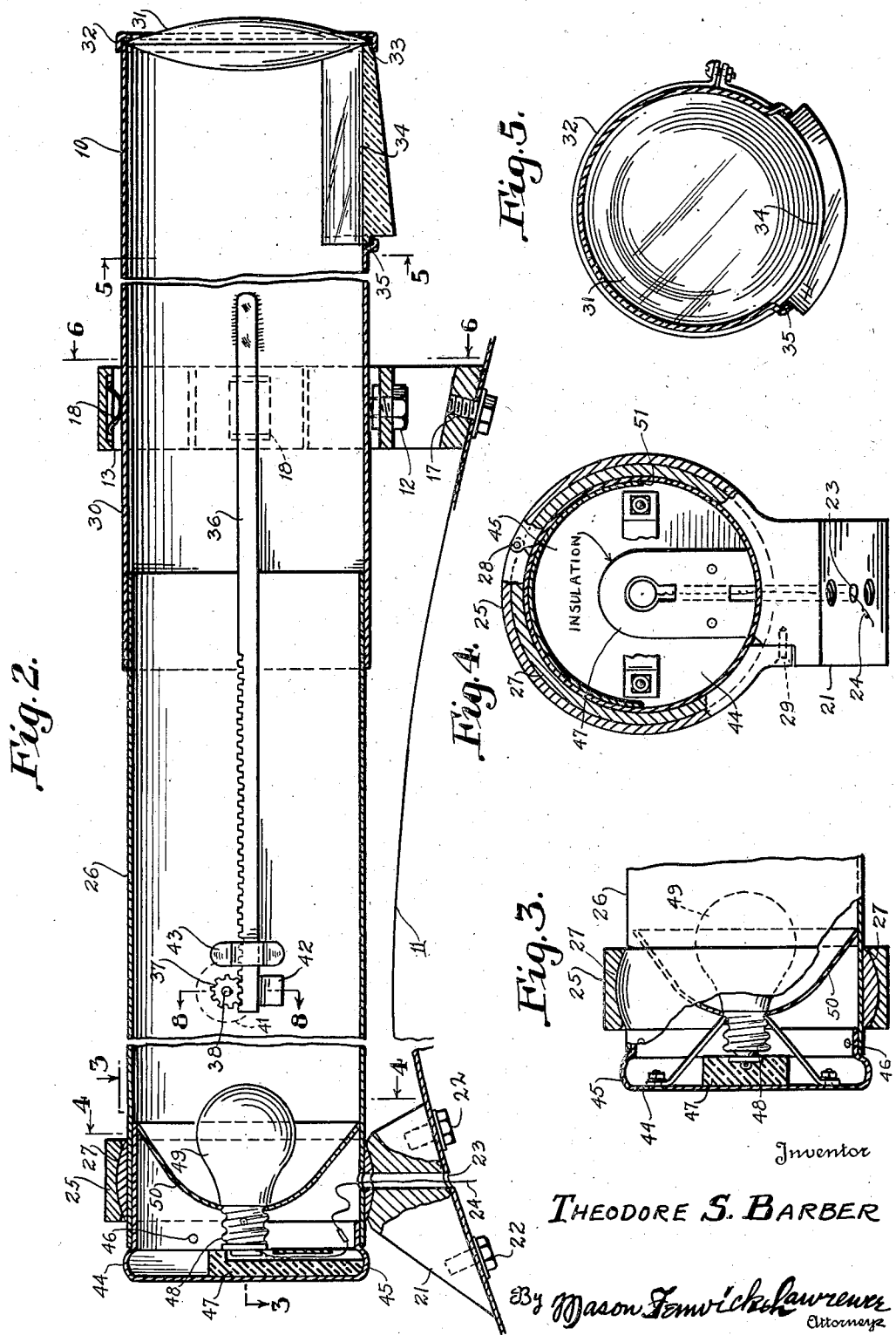
Inventor
THEODORE S. BARBER
By Mason Fenwick Lawrence
Attorneys Patented June 25, 1935

2,006,125

UNITED STATES PATENT OFFICE 2,006,125

HEADLIGHT

Theodore S. Barber, Wilkes-Barre, Pa.

Application April 12, 1934, Serial No. 720,320

1 Claim. (Cl. 240—41.3)

This invention relates to headlights; and more particularly, to a telescope type adaptable for use on motor vehicles and the like.

Heretofore, telescoping headlights have been designed, but have not been particularly practical due to the complication of design. One of the many problems present in the use of headlights for vehicles is to device means for illuminating the dead spot usually occurring immediately in front of the wheels of the vehicle. Various dimming devices have been utilized, but usually if the lights are operated to cast illumination on the roadway immediately in front of the vehicle, the light sent down the road is sacrificed.

By my invention, not only is the direct lighting or illumination properly focused and maintained, but illumination of the dead spot immediately in front of the vehicle is likewise provided.

The prime object of my invention is to provide apparatus whereby the direct or long range light is properly focused and will be maintained at all times; and at the same time, the short range light is available.

Another object is to provide telescoping means for regulating or adjusting the focus of the lights by a simple and efficient means.

Other objects will be disclosed in the specification and claim forming a part of this application.

In the drawings:

Figure 2 is a vertical section of the telescoping headlight;

Figure 3 is a fragmentary vertical section on line 3—3 of Figure 2;

Figure 4 is a vertical section taken on line 4—4 of Figure 2;

Figure 5 is a vertical section taken on line 5—5 of Figure 2;

Referring to the drawings, in which similar parts are designated by like numerals:

Figure 1:
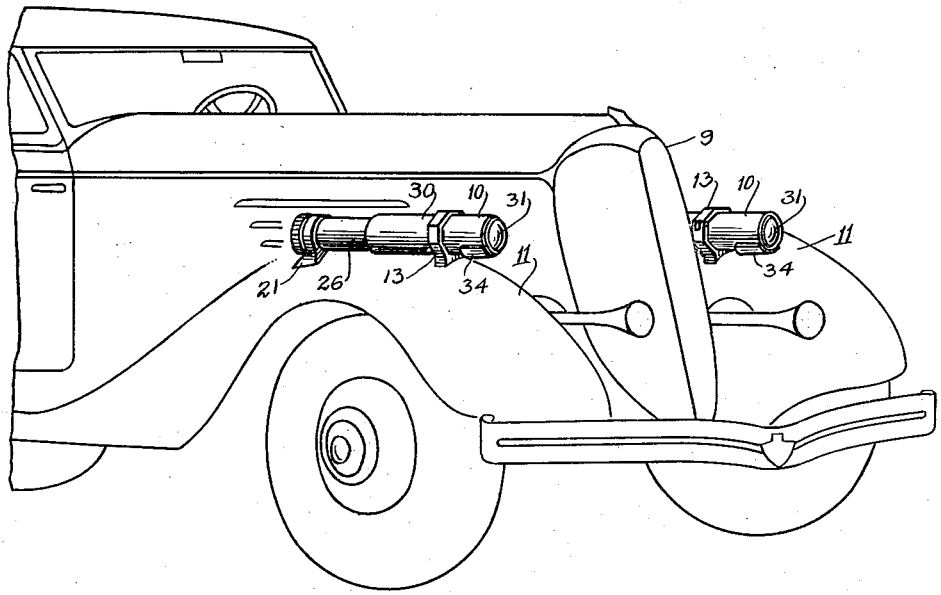
Figure 1 is a front end perspective of an automobile showing the lighting apparatus in position.
Figure 6:
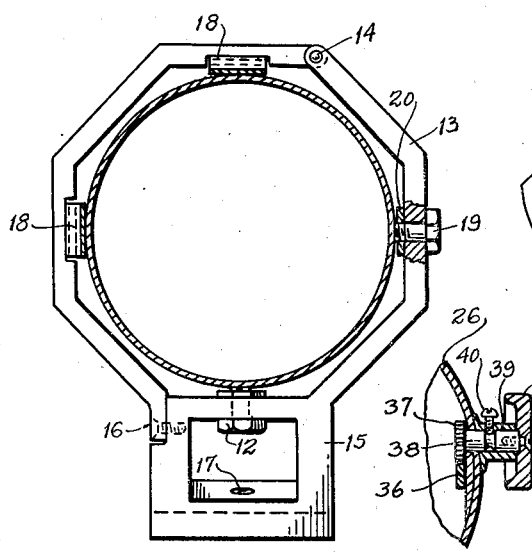
Figure 6 is a vertical section taken on line 6—6 of Figure 2.
Figure 7:
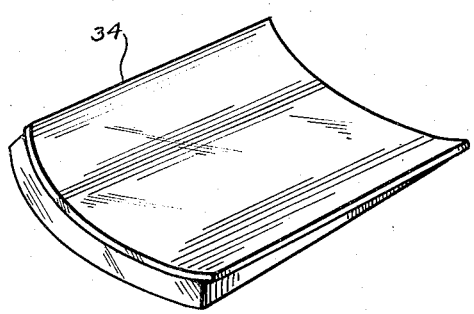
Figure 7 is a detail view of a glass prism used for short range lighting.
Figure 8:
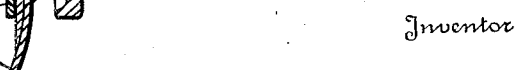
Figure 8 is a fragmentary section of the adjusting knob for the telescope feature.

Numeral 9 designates a motor vehicle having telescoping headlights 10 mounted on fenders 11. A bracket 13 surrounds each headlight 10 and supports the same. The frame of the bracket 13 is hingedly connected at 14 and secured to the base portion 15 of the bracket 13 by a screw 16. A slotted opening 17 extends through the fender 11 and base member 15 to receive a bolt and permit side movement in the event the fenders 11 are not truly in alignment. The bracket 13 is made octagon in shape to simplify adjustments through take-up in springs 18 and adjusting screws 19 and 12, which are held in place by lock nuts 20. A rear support 21 of proper height and curvature to fit the fender is secured thereto by bolts 22 and has extending therethrough an opening 23 adapted to receive an armored cable 24. A circular bracket 25 is adapted to hold one section of the telescope 26 in a ball and socket joint 27 to permit movement for adjustment in a horizontal and vertical position. The circular bracket 25 is hinged at 28 and secured to the rear support 21 by screws 29.

The telescoping headlight 10 consists in a rear section 26 and a forward section 30. The section 30 is slidably mounted on section 26. Under this arrangement, dirt and water are prevented from being driven into the close fitting tubes, while the vehicle 9 is proceeding in a forward direction. The forward section 30 is fitted with a double convex lens 31 and is held in position against the front of the section 30 with a lens holder 32.

Between the lens 31 and the forward tube 30 is a narrow fiber gasket 33. Adjacent to the lens 31, the lower portion of the tube 30 is cut out and fitted with a forty-five degree section of glass prism 34. A fiber gasket 35 is fitted between the prism 34 and the tube 30. The forward section 30 has a reflector finish on the inside with a rack 36 welded in position on the inside, the operation of which permits forward and backward movement of the front section 30.

In cooperation with the rack 36 is a pinion 37 mounted on a shaft 38 and extending through a hollow arbor 39. A screw 40 secures the same into place. A knurled knob 41 is connected to the shaft 38 and operates the same. The rack 36 and pinion 37 have a filler 42 fitted behind the rack and pinion against the inside of the telescope 10. A guard 43 is placed over the rack 36 to keep it in alignment. The rear of the section 26 has a tight-fitting end piece 44 with knurled edges 45, and is held in place by screws 46. The end piece 44 has an insulating block 47 in which is mounted a light socket 48 having the usual terminals and bulb 49. A parabolic reflector 50 is placed behind the bulb for reflecting purposes. The bottom portion 51 of the end piece 44 is cut away on the sides and bottom to facilitate assembly of different parts. The reflector 50 is designed to throw light in parallel lines to the lens 31.

It is obvious that various types of bulbs may be used without departing from my invention.

As actually used, the brackets 13 and 21 are mounted on fenders or suitable supports and the hinged portions 14 and 28 are open to receive the telescoping headlights. The hinged portions are then secured in place. The ball and socket joint 27 permits adjustment for alignment purposes, and the operation of the knob 41 will adjust the focus of the lens 31 in relation to the bulb 49. The interior of the telescoping sections 26 and 30 is highly polished and will reflect light through the lens to the prism 34 with a resulting diffusion of light which will illuminate the roadway immediately in front and on both sides of the vehicle. At the same time, the direct light rays from the bulb will be thrown through the lens 31 and thus visibility will be greatly facilitated. The adjustment of the telescope sections will depend upon conditions; and, although I have shown a manual adjustment on the headlights, the same could be accomplished from the dashboard by a simple lever or rod connection.

Numerous variations may doubtless be devised by persons skilled in the art without departing from the principles of my invention. I, therefore, desire no limitations to be imposed on my invention, except such as are indicated in the appended claim.

What I claim is:

A headlight comprising an elongated tubular body having a front and a rear section and being slidable on each other, brackets for supporting said sections, the bracket for the forward section having spring adjustable take-up screws extending into contact with said section, a portion of said bracket being hingedly connected, the support for the rear section having a portion of the bracket hingedly connected thereto, an end piece on said rear section, said end piece having a ball and socket connection with said support for adjustment and alignment purposes, a source of illumination at one end, said tubular body having interior reflector walls and a lens at the other end, and means for telescoping one section over the other.

THEODORE S. BARBER.